(No Model.)
M. & C. HEINEKE.
CLUTCH MECHANISM FOR REVERSING MOTION.
No. 499,226. Patented June 13, 1893.
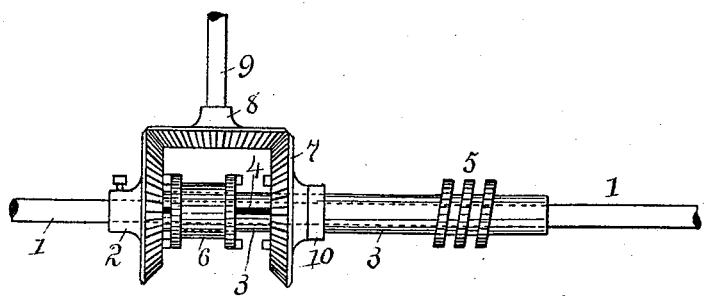
ATTEST.
Helen Graham
William Graham.
INVENTORS.
M. and C. HEINEKE
by their attorney
L. P. Graham

UNITED STATES PATENT OFFICE.

MARTIN HEINEKE, OF SPRINGFIELD, AND CHARLES HEINEKE, OF CARLINVILLE, ILLINOIS.

CLUTCH MECHANISM FOR REVERSING MOTION.

SPECIFICATION forming part of Letters Patent No. 499,226, dated June 13, 1893.

Application filed February 20, 1893. Serial No. 463,004. (No model.)

*To all whom it may concern:*

Be it known that we, MARTIN HEINEKE, of Springfield, in the county of Sangamon, and CHARLES HEINEKE, of Carlinville, in the county of Macoupin, State of Illinois, have invented certain new and useful Improvements in Clutch Mechanism for Reversing Motion, of which the following is a specification.

This invention is particularly adapted to reversing the horizontal swing of straw stackers, though it may be used for various other purposes, and it is embodied in the details of construction hereinafter set forth and claimed.

In the drawing forming part of this specification a shaft adapted to rotate continuously in one direction is shown at 1. Sleeve 3 fits loosely on the shaft and is provided with worm 5 or other transmitting device. Gear wheel 2 is fixed on shaft 1. Gear wheel 7 is journaled loosely on the sleeve. It receives motion from wheel 2 through intermediate wheel 8 on shaft 9, and consequently revolves in a direction contrary to the direction of the rotation of wheel 2. That portion of the sleeve extending between wheels 2 and 7 has a groove, 4, and clutch 6 has a feather or spline fitting such groove. The wheels, 3 and 7, are clutch wheels, and the clutch member is adapted to engage and be rotated by either of said wheels. A collar, 10, holds wheel 7 in operative contact with wheel 8. As the shaft revolves wheel 2 is driven continuously in one direction, and wheel 7 in the contrary direction, while the sleeve and the clutch are idle so long as the clutch is kept out of contact with the wheels. In operation, however, the clutch is in mesh with one or the other of the wheels, and the shaft is driven in one direction until the clutch is shifted, when it and the worm, or other power transmitter, are driven in the contrary direction.

The mechanism described is simple and compact, and it permits direct application of power.

We claim—

The combination in clutch mechanism for reversing motion, of a shaft, a sleeve mounted loosely on the shaft and having a power transmitter, a gear wheel fixed on the shaft, another gear wheel journaled loosely on the sleeve, an intermediate gear wheel connecting the wheel of the shaft with the wheel of the sleeve, and a clutch splined on the sleeve between the wheel of the sleeve and the wheel of the shaft and adapted to engage either of said wheels, substantially as set forth.

In testimony whereof we sign our names in the presence of two subscribing witnesses.

MARTIN HEINEKE.
     CHARLES HEINEKE.

Witnesses:
 FRED L. SATTLEY,
 WARD M. CARTER.